(12) United States Patent
Wei

(10) Patent No.: US 11,772,034 B2
(45) Date of Patent: Oct. 3, 2023

(54) WASTE GAS PURIFICATION SYSTEM

(71) Applicant: Jung-Tsung Wei, Tainan (TW)

(72) Inventor: Jung-Tsung Wei, Tainan (TW)

( * ) Notice: Subject to any disclaimer, the term of this patent is extended or adjusted under 35 U.S.C. 154(b) by 0 days.

(21) Appl. No.: 17/520,962

(22) Filed: Nov. 8, 2021

(65) Prior Publication Data

US 2022/0143542 A1 May 12, 2022

(30) Foreign Application Priority Data

Nov. 9, 2020 (TW) .................................. 109139064
Dec. 29, 2020 (TW) .................................. 109146685

(51) Int. Cl.

| B01D 49/00 | (2006.01) |
|---|---|
| B01D 47/02 | (2006.01) |
| B01D 46/52 | (2006.01) |
| B01D 46/42 | (2006.01) |
| B01D 46/44 | (2006.01) |

(52) U.S. Cl.

CPC ............ B01D 49/00 (2013.01); B01D 46/42 (2013.01); B01D 47/024 (2013.01); *B01D 46/442* (2013.01); *B01D 46/528* (2013.01)

(58) Field of Classification Search

CPC ........ B01D 49/00; B01D 53/06; B01D 46/02; B01D 46/42; B01D 2239/0407; B01D 2239/065; B01D 39/1623; B01D 46/442; F24F 8/00; F24F 8/10; F24F 8/108; F24F 8/80

See application file for complete search history.

(56) References Cited

U.S. PATENT DOCUMENTS

| 2,493,726 A * | 1/1950 | O'Day ................... B01D 46/00 |
|---|---|---|
| | | 55/525 |
| 2007/0060036 A1 * | 3/2007 | Shibuya .................. F24F 13/28 |
| | | 454/187 |
| 2009/0141963 A1 | 6/2009 | Laurint et al. |

(Continued)

FOREIGN PATENT DOCUMENTS

| CN | 2702771 Y  * | 6/2005 | ............ B01D 47/06 |
|---|---|---|---|
| CN | 101910515 A | 12/2010 | |
| CN | 103212257 A | 7/2013 | |

(Continued)

OTHER PUBLICATIONS

CN206463639U_ENG (Espacenet machine translation of Kluge) (Year: 2017).*

(Continued)

*Primary Examiner* — Gabriel E Gitman
(74) *Attorney, Agent, or Firm* — Brooks Kushman P.C.

(57) ABSTRACT

A waste gas purification system includes a gas container, a gas input unit, a gas output unit, and a contaminant capturing apparatus disposed in the gas container. The contaminant capturing apparatus includes a driver device, and a capturing device to be driven by the driver device. The driver device includes two rollers, and the capturing device includes a tape disposed to continuously move from one roller to another roller when the rollers are rotating. The tape has a surface coated with an adhesive to purify waste gas entering from the gas input unit by capturing particulate matter in the waste gas before being discharged via the gas output unit.

15 Claims, 6 Drawing Sheets

(56) References Cited

U.S. PATENT DOCUMENTS

| | | |
|---|---|---|
| 2015/0177143 A1 | 6/2015 | Fujita et al. |
| 2017/0082305 A1* | 3/2017 | Law .................. A61L 9/205 |

FOREIGN PATENT DOCUMENTS

| | | | | |
|---|---|---|---|---|
| CN | 104380079 A | | 2/2015 | |
| CN | 106310816 A | * | 1/2017 | ......... B01D 46/0036 |
| CN | 206463639 U | * | 9/2017 | ......... B01D 46/2403 |
| KR | 20140077494 A | * | 6/2014 | ........... B01D 46/106 |
| KR | 20160076569 A | * | 7/2016 | ............ B01D 46/00 |
| KR | 20180056280 A | * | 5/2018 | ......... B01D 46/0005 |

OTHER PUBLICATIONS

CN106310816A_ENG (Espacenet machine translation of Pang) (Year: 2017).*

CN2702771Y_ENG (Espacenet machine translation of Zheng) (Year: 2005).*

KR20160076569A_ENG (Espacenet machine translation of Jo) (Year: 2016).*

KR20140077494A_ENG (Espacenet machine translation of Kim) (Year: 2014).*

KR20180056280A_ENG (Espacenet machine translation of Yoo) (Year: 2018).*

Search Report, which was issued to PCT Application No. PCT/IB2021/060250 dated Apr. 6, 2022.

* cited by examiner

WASTE GAS PURIFICATION SYSTEM

CROSS-REFERENCE TO RELATED APPLICATIONS

This application claims priority of Taiwanese Invention Patent Application Nos. 109139064 and 109146685, respectively filed on Nov. 9 and Dec. 29, 2020.

FIELD

The disclosure relates to an apparatus for processing waste gas, and more particularly to a waste gas purification system.

BACKGROUND

With the development of industries, many factories will set up an apparatus that burns fuel to create a high temperature environment for high temperature processing. Such apparatus usually uses coals or fossil fuel, which will generate a large amount of waste gas. The waste gas usually contains harmful substances such as granular pollutants, sulfur oxides, hydroxides, etc. In addition to those used in factories, other machines such as transportation vehicles may also generate waste gas during operation. In order to prevent the waste gas generated during the operation of these apparatuses or machines from being directly emitted to the atmosphere and creating pollution, environmental protection regulations stipulate emission standards with respect to the waste gas or smoke generated by such apparatus or machine, so industries usually set up a waste gas processing system on the apparatus or machine to purify the waste gas.

SUMMARY

Therefore, an object of the disclosure is to provide a waste gas purification system that can effectively purify waste gas.

According to the disclosure, the waste gas purification system includes a gas container, a gas input unit for entrance of waste gas into the gas container, a gas output unit for discharge of the waste gas out of the gas container after the waste gas is purified, and a contaminant capturing apparatus that is disposed in the gas container. The contaminant capturing apparatus includes a driver device, and a capturing device to be driven by the driver device into continuous movement. The driver device includes a first roller and a second roller, and the capturing device includes a tape that is connected to the first roller and the second roller and that is configured to continuously move from the first roller to the second roller when the first roller and the second roller are rotating. The tape has a surface coated with an adhesive to purify the waste gas by capturing particulate matter in the waste gas.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
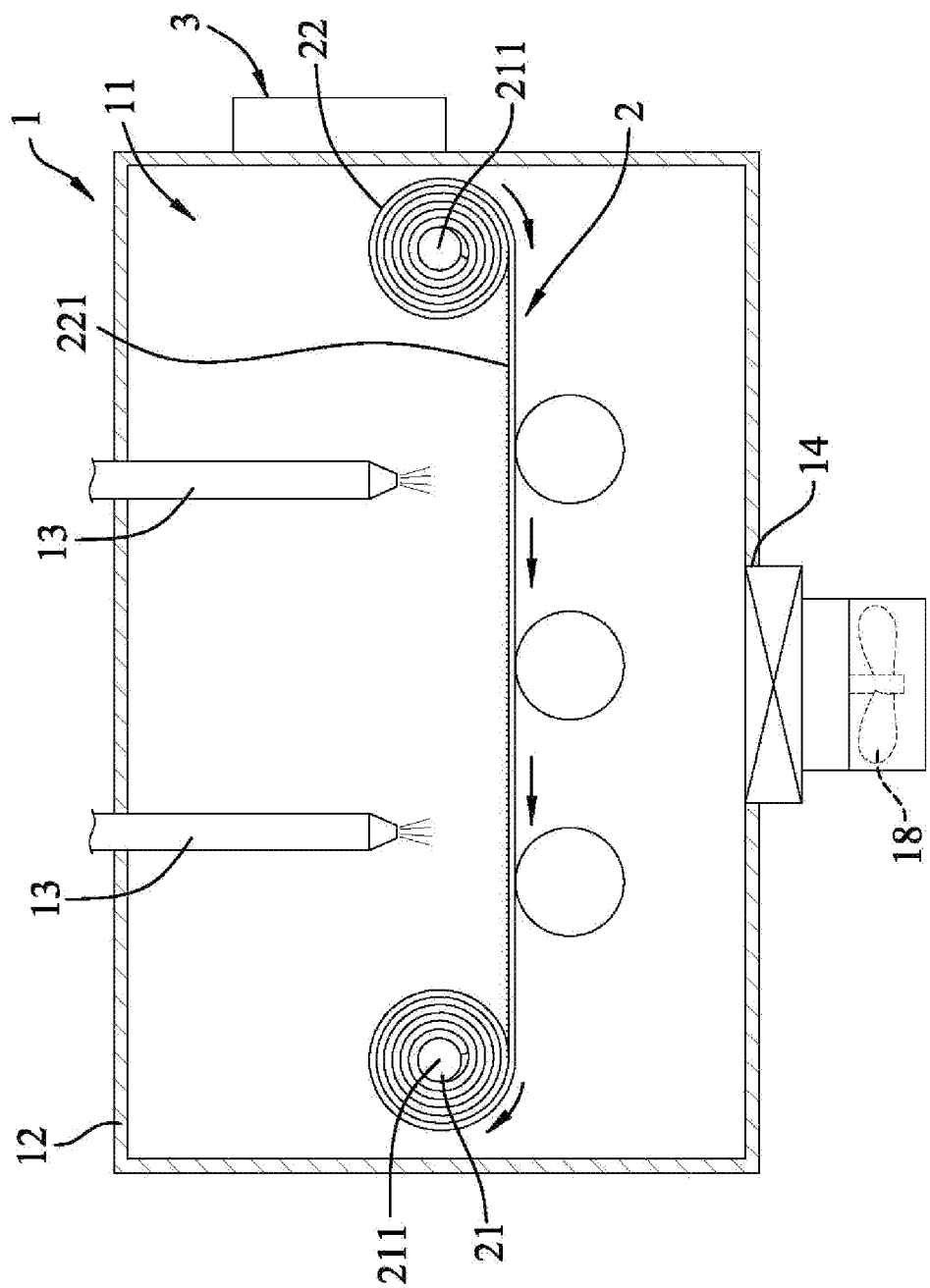
FIG. 1 is a schematic diagram illustrating a part of a first embodiment of a waste gas purification system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
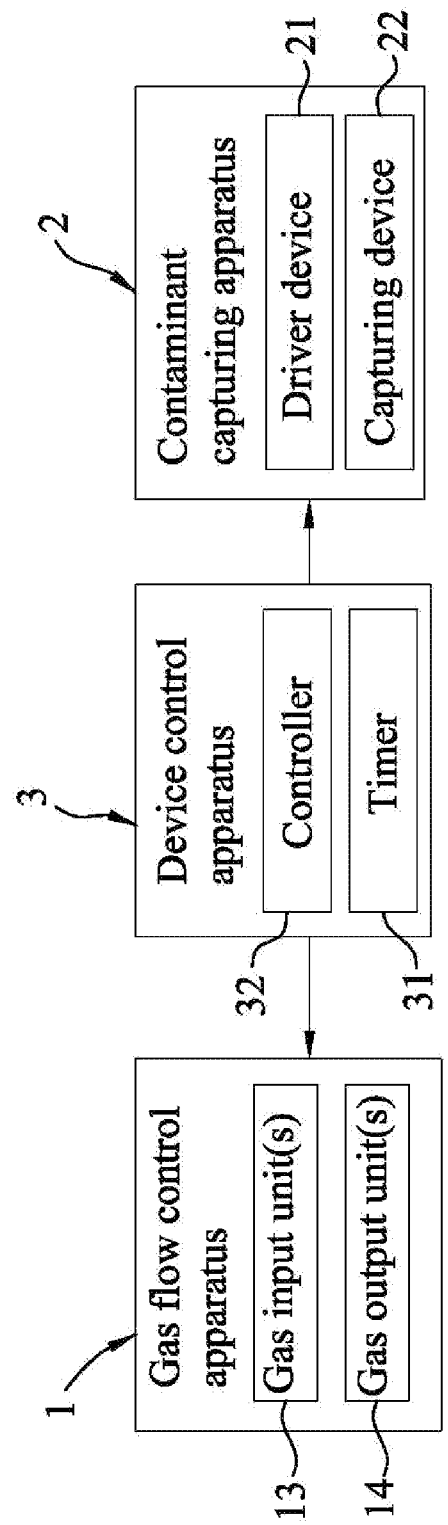
FIG. 2 is a block diagram illustrating the first embodiment.

Referring to FIGS. 1 and 2, a first embodiment of a waste gas purification system according to this disclosure is adapted to be connected to a waste-gas-generating apparatus (not shown) that generates waste gas, receives and purifies the waste gas from the waste-gas-generating apparatus, and then discharges the purified waste gas from the waste gas purification system. The waste gas purification system includes a gas flow control apparatus 1, a contaminant capturing apparatus 2 and a device control apparatus 3.

The gas flow control apparatus 1 includes a gas container 12 that defines a purification space 11, at least one gas input unit 13 to be connected to the waste-gas-generating apparatus for entrance of the waste gas into the purification space 11 of the gas container 12, and at least one gas output unit for discharge of the waste gas from the gas container 12 after the waste gas is purified. In this embodiment, the gas flow control apparatus 1 includes two gas input units 13 and one gas output unit 14, but this disclosure is not limited in this respect.

In this embodiment, each of the gas input units 13 includes a nozzle that is mounted to the gas container 12 and that is configured to allow for entrance of the waste gas (e.g., by injection) generated by the waste-gas-generating apparatus into the purification space 11 of the gas container 12, continuously or periodically. In some embodiments, the gas input units 13 may include openings that are formed in the gas container 12 and that allow passage of the waste gas therethrough. In this embodiment, the gas output unit 14 includes an opening formed in the gas container 12 at an opposite side to the gas input units 13 (e.g., the gas input units 13 are disposed at the upper part of the gas container 12, and the gas output unit 14 is disposed at the lower part of the gas container 12 in FIG. 1), but this disclosure is not limited in this respect (i.e., it may also be that the gas input unit(s) 13 and the gas output unit(s) 14 are not disposed at opposite sides of the gas container 12). In this embodiment, each of the gas input units 13 and the gas output unit 14 may include a valve (not shown) that is operable to make the corresponding one of the gas input units 13 and the gas output unit 14 open or closed. In some embodiments, the gas flow control apparatus 1 may further (but not necessarily) include an exhaust fan 18 mounted to the gas output unit 14 for assisting in discharging the purified waste gas from the gas container 12.

The contaminant capturing apparatus 2 is disposed in the gas container 12, and includes a driver device 21, and a capturing device 22 to be driven by the driver device 21 into continuous movement. In this embodiment, the driver device 21 includes two rollers 211 that are spaced apart from each other, and a motor (not shown) connected to and controlling rotation of the rollers 211.

The capturing device 22 includes a capture member 221 that has a surface coated with adhesive to capture particulate matter in the waste gas, thereby purifying the waste gas. In this embodiment, the capture member 221 is a tape that extends below the gas input units 13 from one roller 211 to another roller 211, so the tape moves from one roller 211 to another roller 211 under the gas input units 13 when the rollers 211 rotate. A portion of the tape that extends between the rollers 211 and under the gas input units 13 has a sticky surface (i.e., the surface coated with adhesive) facing the gas input units 13 to be in contact with the waste gas, so as to purify the waste gas by adhering particulate matter in the waste gas. It is noted that a number of the contaminant capturing apparatus 2 included in the waste gas purification system is not limited to one, and can be two, three or more than three in other embodiments.

The device control apparatus 3 includes a timer 31, and a controller 32 communicatively connected to the timer 31, the gas input units 13, the gas output unit 14 and the driver device 21. The controller 32 controls the gas input units 13 to be open after controlling the gas output unit 14 to be closed for performing a gas entering process in which the waste gas enters the gas container 12 through the gas input units 13. After completion of the gas entering process, the controller 32 controls the gas input units 13 to be closed and controls the timer 31 to start timing for a predetermined purification period. When the timing for the predetermined purification period is completed, the controller 32 controls the gas output unit 14 to be open for allowing discharge of the waste gas that has been purified by the contaminant capturing apparatus 2 from the gas container 12.

In other words, the controller 32 controls operations (i.e., to be open or closed) of the gas input units 13 and the gas output unit 14 to direct the waste gas into the purification space 11, and a gas purification process begins. In the gas purification process, the controller 32 controls the driver device 21 to drive operation of the capturing device 22, so the capture member 221 (i.e., the tape in this embodiment) continuously adheres the particulate matter in the waste gas during the continuous movement. After the predetermined purification period, the gas purification process is completed, and the controller 32 controls operations of the gas input units 13 and the gas output unit 14 again to discharge the purified waste gas out of the gas container 12. The above steps may be repeated to purify the waste gas that is continuously generated by the waste-gas-generating apparatus.

Figure 3:
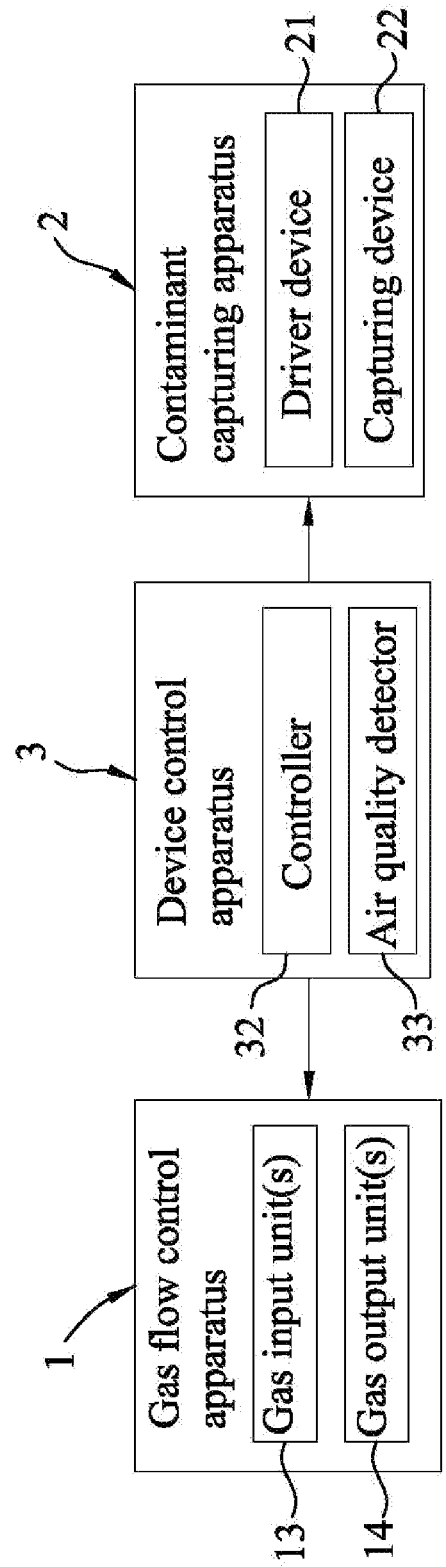
FIG. 3 is a block diagram illustrating a first variation of the first embodiment.

Referring to FIGS. 1 and 3, a first variation of the first embodiment is provided. In the first variation, the device control apparatus 3 includes an air quality detector 33 (which may also be called air quality monitor or air quality detection system in the market) that is disposed within the purification space 11 of the gas container 12 and that is communicatively connected to the controller 32, and the timer 31 in FIG. 2 is omitted. The air quality detector 33 is configured to detect air quality of the waste gas (e.g., concentration of particulate matter in the waste gas) in the purification space 11 of the gas container 12, and to generate an air quality signal that indicates the air quality of the waste gas as detected thereby. The controller 32 receives and analyzes the air quality signal from the air quality detector 33. Upon determining that the air quality of the waste gas as indicated by the air quality signal conforms to an emission standard, the controller 32 controls the gas output unit 14 to be open for discharging the purified waste gas out of the gas container 12.

Figure 4:
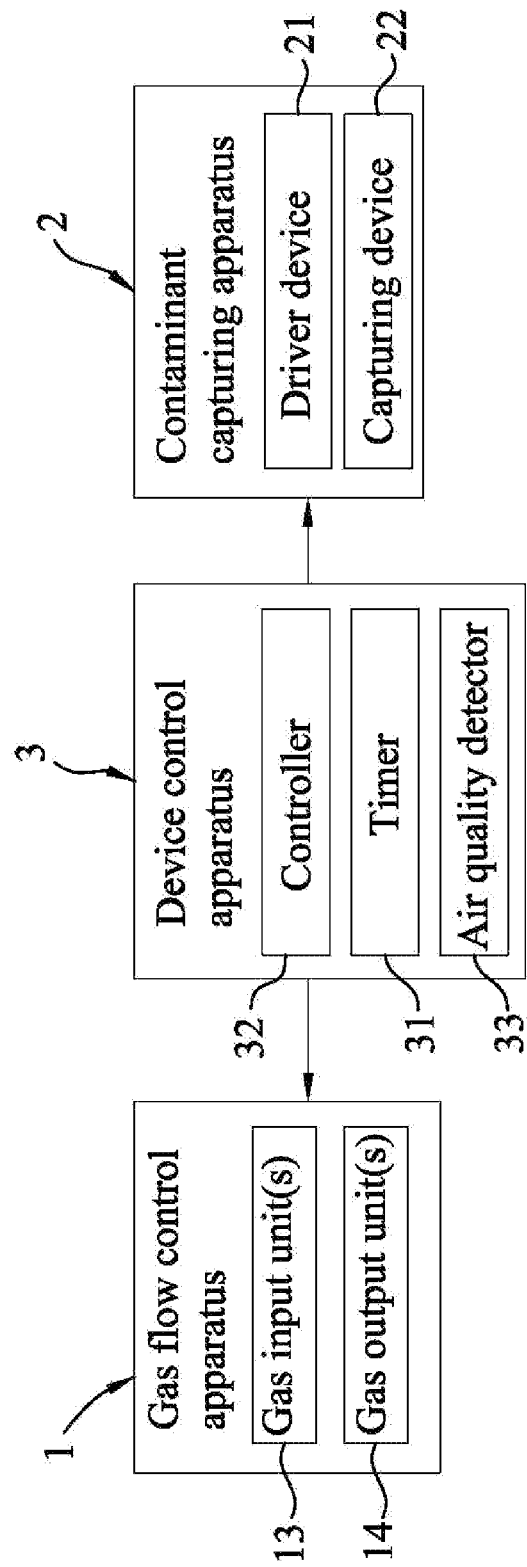
FIG. 4 is a block diagram illustrating a second variation of the first embodiment.

Referring to FIGS. 1 and 4, a second variation of the first embodiment is provided to include both of the timer 31 in FIG. 2 and the air quality detector 33 in FIG. 3. In this variation, the controller 32 controls the air quality detector 33 to detect air quality of the waste gas after completion of the timing for the predetermined purification period. Upon determining that the air quality of the waste gas as indicated by the air quality signal conforms to the emission standard, the controller 32 controls the gas output unit 14 to be open for discharging the purified waste gas out of the gas container 12, so the air quality of the waste gas that has been purified for the predetermined purification period can be ensured. Upon determining that the air quality of the waste gas as indicated by the air quality signal does not conform to the emission standard, the controller 32 controls the timer 31 to time for a predetermined extra time period, so as to prolong the gas purification process. After completion of the timing for the predetermined extra time period, the controller 32 controls the air quality detector 33 to detect the air quality of the waste gas again, and determines whether the air quality of the waste gas as indicated by the air quality signal has become conforming to the emission standard. Upon determining that the air quality of the waste gas has become conforming to the emission standard, the controller 32 controls the gas output unit 14 to be open for discharging the purified waste gas out of the gas container 12, and automatically adjusts/updates the predetermined purification period by adding the predetermined extra time period to the original predetermined purification period, so the next time the gas purification process is performed, the gas purification process will be performed for the updated predetermined purification period. If the controller 32 determines again that the air quality of the waste gas does not conform to the emission standard, the timing for the predetermined extra time period will be repeated to further prolong the gas purification process, and the above-mentioned relevant procedures of determining the air quality and updating the predetermined purification period will also be repeated.

In some implementations of the first or second variation (see FIG. 3 or 4) of the first embodiment, the controller 32 may control an operation speed of the driver device 21 based on the air quality signal received from the air quality detector 33. In detail, the controller 32 may control the driver device 21 to increase the operation speed of the driver device (so the rotational speed of the rollers 211 as shown in FIG. 1 may increase) when the air quality of the waste gas as indicated by the air quality signal is worse than a first predetermined level, and control the driver device 21 to reduce the operation speed of the driver device 21 (so the rotational speed of the rollers 211 as shown in FIG. 1 may decrease) when the air quality of the waste gas as indicated by the air quality signal is better than a second predetermined level that represents a better air quality than that represented by the first predetermined level. As a result, the contaminant capturing apparatus 2 can efficiently and effectively capture the particulate matter in the waste gas without incurring excessive waste material from use of the capture member 221.

In some implementations of the first or second variation (see FIG. 3 or 4) of the first embodiment, the controller 32 may adjust a gas flow in the gas input units 13 based on the air quality of the waste gas as indicated by the air quality signal. Upon determining that the air quality of the waste gas as indicated by the air quality signal is worse than the first predetermined level, the controller 32 may reduce a length of time the gas input units 13 allow for entrance of the waste gas into the gas container 12, reduce a gas flow rate in the gas input units 13, or control the gas input units 13 to be closed immediately, so as to reduce influence of incoming waste gas on particulate capturing performance and to thus provide sufficient time for the particulate matter in the purification space 11 to fall onto the sticky surface of the capture member 221. When the air quality of the waste gas as indicated by the air quality signal is better than the second predetermined level, the controller 32 may prolong a length of time the gas input units 13 allow for entrance of the waste gas into the gas container 12, or increase a gas flow rate in the gas input units 13, so as to promote the efficiency of gas purification.

In some implementations of the first embodiment, the controller 32 may compare the air quality of the waste gas when the waste gas initially entered the gas container 12 and the air quality of the waste gas when the waste gas is being discharged out of the gas container 12, and output an air pollution index (API) signal that indicates air pollution indices of the waste gas before and after purification by the contaminant capturing apparatus 2. The device control apparatus 3 may further include a display (not shown) that is communicatively connected to the controller 32 for receiving the API signal therefrom, and that displays the air pollution indices of the waste gas before and after purification according to the API signal, so users can become aware of improvement on the air quality of the waste gas.

Figure 5:
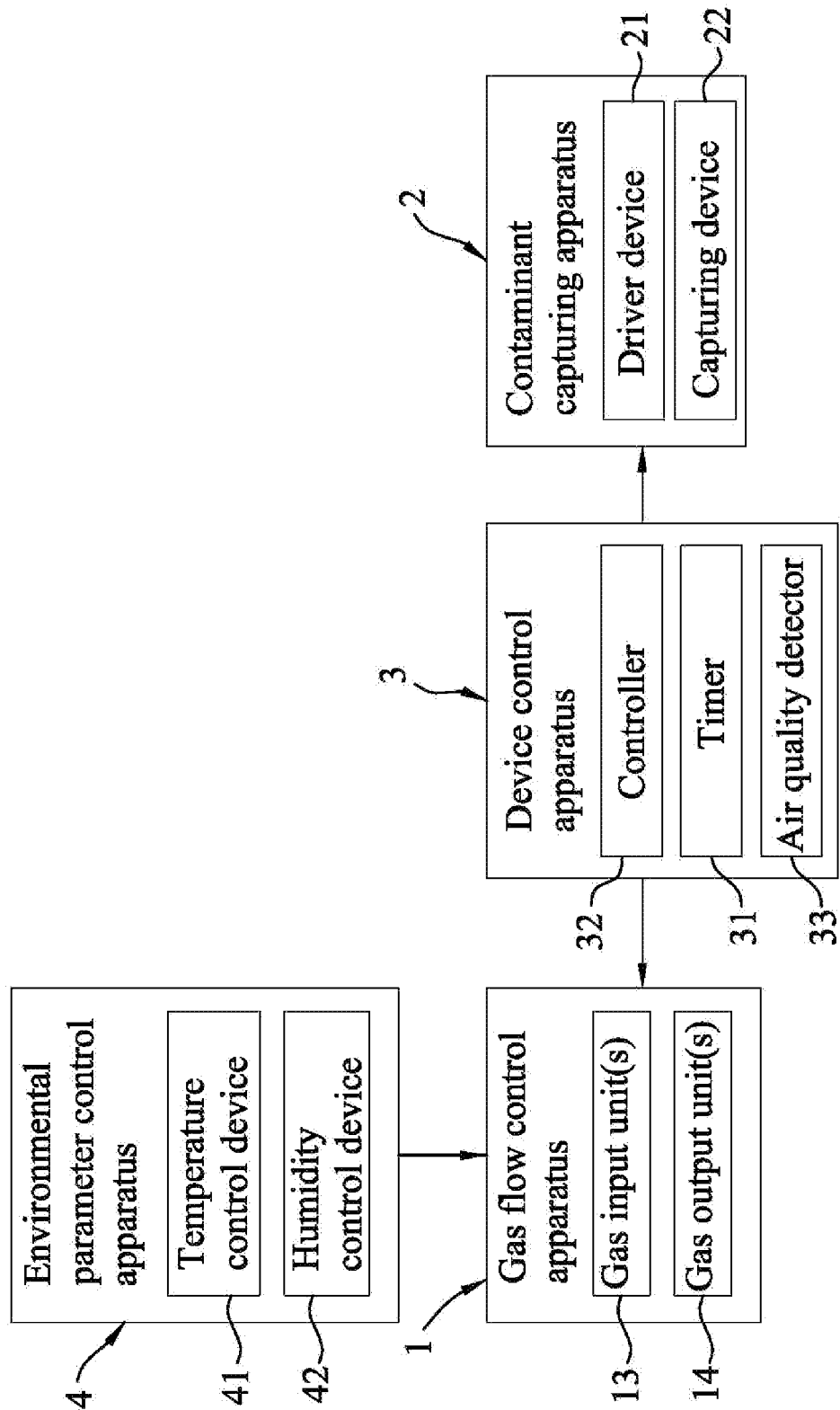
FIG. 5 is a block diagram illustrating a second embodiment of a waste gas purification system according to the disclosure.

Referring to FIG. 5, a second embodiment of a waste gas purification system according to this disclosure is similar to the first embodiment, and further includes an environmental parameter control apparatus 4. The environmental parameter control apparatus 4 includes a temperature control device 41 and a humidity control device 42. The temperature control device 41 is disposed to adjust the waste gas to having a predetermined temperature before the waste gas enters the gas container 12 through the gas input units 13, and may be realized as a fan that blows wind toward sidewalls of the gas input units 13 to lower the temperature of the waste gas in the gas input units 13, an air conditioner that blows cold or warm air toward sidewalls of the gas input units 13, or electric heating tubes that are embedded in the sidewalls of the gas input unit 13, etc. The humidity control device 42 is disposed to adjust the waste gas to having a predetermined humidity before the waste gas enters the gas container 12 through the gas input units 13, and may be realized as a dehumidifier and/or a humidifier. By virtue of adjusting the temperature and the humidity of the waste gas, the stickiness of the adhesive on the capture member 221 may be optimized, so as to enhance the purification efficiency of the contaminant capturing apparatus 2 adhering the particulate matter in the waste gas. In some variations of the second embodiment, the environmental parameter control apparatus 4 may use only one of the temperature control device 41 and the humidity control device 42, or may further include other devices that can adjust environmental parameters. Since positioning and structures of the devices for environmental parameter control should be known to one skilled in the art, details thereof are omitted herein for the sake of brevity.

Figure 6:
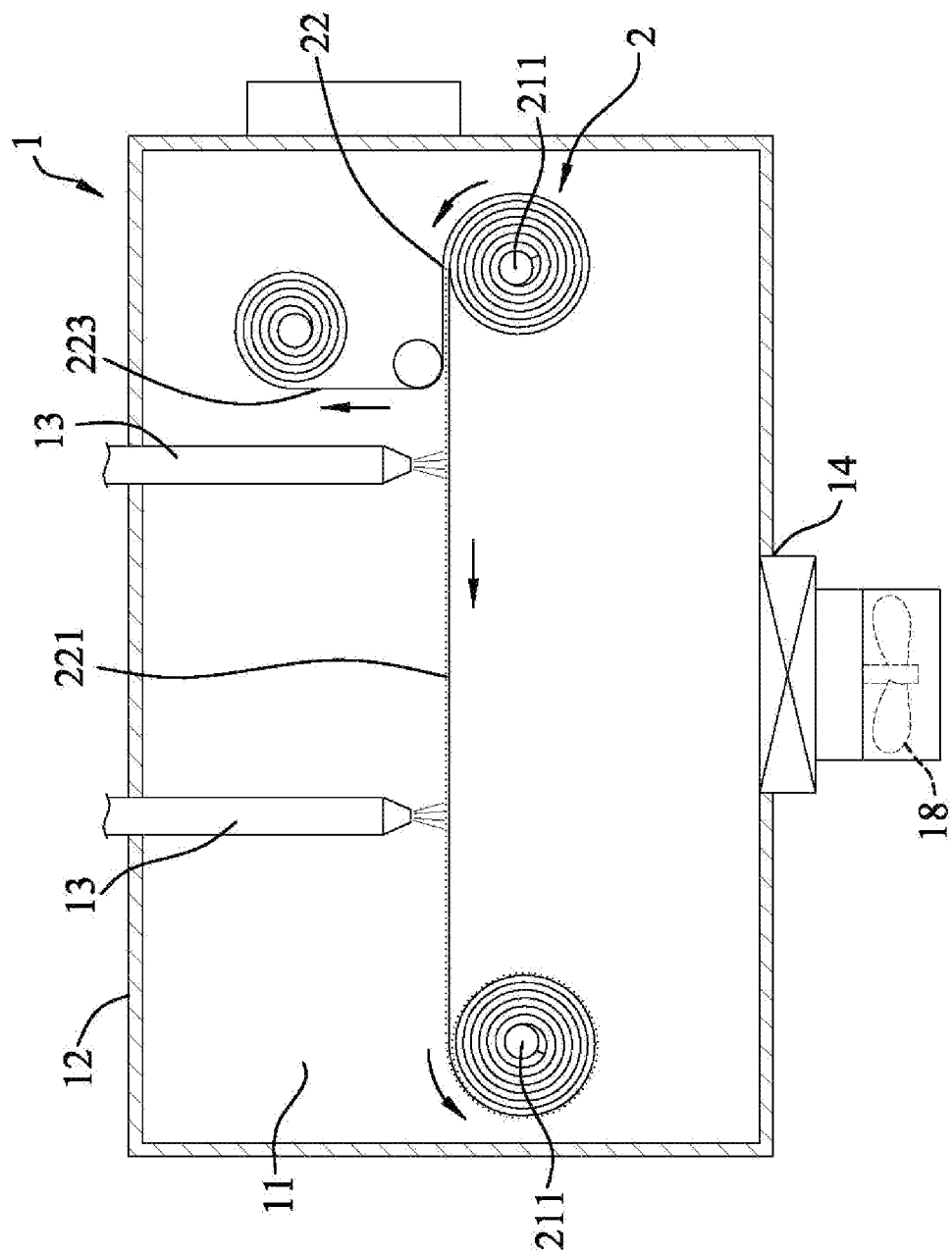
FIG. 6 is a schematic diagram illustrating a part of a third embodiment of a waste gas purification system according to the disclosure.

FIG. 6 illustrates a third embodiment of a contaminant capturing apparatus according to this disclosure, which is similar to the first embodiment as shown in FIG. 1. In the third embodiment, the capturing device 22 further includes a release paper 223 that is detachably attached to the capture member 221. The release paper 223 is disposed to be detached from the capture member 221 before the capture member 221 moves to below the gas input units 13. In this embodiment, a roller may be used to roll up the detached release paper 223, but this disclosure is not limited in this respect.

To sum up, the embodiments of the waste gas purification system can effectively purify the waste gas by using adhesive to stick the particulate matter in the waste gas. In some embodiments, the use of the air quality detector 33 can ensure the air quality of the purified waste gas before the same is discharged into the atmosphere.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A waste gas purification system, comprising:
   a gas container;
   a gas input unit for entrance of waste gas into said gas container;
   a gas output unit for discharge of the waste gas out of said gas container after the waste gas is purified;
   a contaminant capturing apparatus that is disposed in said gas container, and that includes a driver device, and a capturing device to be driven by said driver device into continuous movement; and
   a device control apparatus that includes an air quality detector disposed in said gas container, and a controller;
   wherein said driver device includes a first roller and a second roller, and said capturing device includes a tape that is connected to said first roller and said second roller and that is configured to continuously move from said first roller to said second roller when said first roller and said second roller are rotating;
   wherein said tape has a surface coated with an adhesive to purify the waste gas by capturing particulate matter in the waste gas;
   wherein said controller is communicatively connected to said air quality detector, said gas input unit, and said gas output unit, and is configured to control said gas input unit to be open after controlling said gas output unit to be closed, so as to perform a gas entering process in which the waste gas enters said gas container through said gas input unit, and said controller is further configured to control said gas input unit to be closed after completion of the gas entering process;

wherein said air quality detector is configured to detect an air quality of the waste gas in said gas container and to generate an air quality signal that indicates the air quality of the waste gas; and wherein said controller is configured to receive the air quality signal from said air quality detector, and to control said gas output unit to be open for discharging the waste gas that has been purified by said contaminant capturing apparatus out of said gas container upon determining that the air quality of the waste gas as indicated by the air quality signal conforms to an emission standard.

2. The waste gas purification system of claim 1, wherein said capturing device further includes a release paper that is detachably attached to said tape.

3. The waste gas purification system of claim 1, wherein said controller is configured to compare the air quality of the waste gas when the waste gas is initially entering said gas container and the air quality of the waste gas when the waste gas is being discharged out of said gas container, and to output an air pollution index signal that indicates air pollution indices of the waste gas before and after purification by said contaminant capturing apparatus.

4. The waste gas purification system of claim 1,
wherein said controller is communicatively connected to said driver device, and is configured to control said driver device to increase an operation speed of said driver device when the air quality of the waste gas as indicated by the air quality signal is worse than a first predetermined level, and to control said driver device to reduce the operation speed of said driver device when the air quality of the waste gas as indicated by the air quality signal is better than a second predetermined level that represents a better air quality than that represented by the first predetermined level.

5. The waste gas purification system of claim 1, wherein said gas input unit is configured to periodically allow for entrance of the waste gas into said gas container.

6. The waste gas purification system of claim 1, further comprising an exhaust fan mounted to said gas output unit.

7. The waste gas purification system of claim 1,
wherein said controller is configured to adjust a gas flow in said gas input unit based on the air quality of the waste gas as indicated by the air quality signal.

8. The waste gas purification system of claim 1, further comprising an environmental parameter control apparatus that includes a temperature control device disposed to adjust the waste gas to having a predetermined temperature before the waste gas enters said gas container through said gas input unit.

9. The waste gas purification system of claim 1, further comprising an environmental parameter control apparatus that includes a humidity control device disposed to adjust the waste gas to having a predetermined humidity before the waste gas enters said gas container through said gas input unit.

10. A waste gas purification system, comprising:
a gas container;
a gas input unit for entrance of waste gas into said gas container;
a gas output unit for discharge of the waste gas out of said gas container after the waste gas is purified;
a contaminant capturing apparatus that is disposed in said gas container, and that includes a driver device, and a capturing device to be driven by said driver device into continuous movement; and
a device control apparatus that includes a timer, an air quality detector, and a controller;
wherein said driver device includes a first roller and a second roller, and said capturing device includes a tape that is connected to said first roller and said second roller and that is configured to continuously move from said first roller to said second roller when said first roller and said second roller are rotating;
wherein said tape has a surface coated with an adhesive to purify the waste gas by capturing particulate matter in the waste gas;
wherein said controller is communicatively connected to said timer, said air quality detector, said gas input unit, and said gas output unit, and is configured to control said gas input unit to be open after controlling said gas output unit to be closed, so as to perform a gas entering process in which the waste gas enters said gas container through said gas input unit, and said controller is further configured to control said gas input unit to be closed and control said timer to start timing for a predetermined purification period after completion of the gas entering process;
wherein said controller is configured to, when the timing for the predetermined purification period is completed, control said air quality detector to detect an air quality of the waste gas in said gas container and to generate an air quality signal that indicates the air quality of the waste gas; and
wherein said controller is configured to receive the air quality signal from said air quality detector, and to control said gas output unit to be open for discharging the waste gas that has been purified by said contaminant capturing apparatus out of said gas container upon determining that the air quality of the waste gas as indicated by the air quality signal conforms to an emission standard.

11. The waste gas purification system of claim 10, wherein said controller is configured to control said timer to start timing for a predetermined extra time period upon determining that the air quality of the waste gas as indicated by the air quality signal does not conform to the emission standard.

12. The waste gas purification system of claim 11, wherein said controller is configured to, after completion of the timing for the predetermined extra time period, control said air quality detector to detect the air quality of the waste gas, and determine whether the air quality of the waste gas as indicated by the air quality signal has become conforming to the emission standard; and
wherein said controller is configured to, upon determining that the air quality of the waste gas has become conforming to the emission standard, control said gas output unit to be open for discharging the waste gas that has been purified by said contaminant capturing apparatus out of said gas container, and automatically update the predetermined purification period by adding the predetermined extra time period to the predetermined purification period.

13. The waste gas purification system of claim 10, wherein said capturing device further includes a release paper that is detachably attached to said tape.

14. A waste gas purification system, comprising:
a gas container;
a gas input unit for entrance of waste gas into said gas container;

a gas output unit for discharge of the waste gas out of said gas container after the waste gas is purified;

a contaminant capturing apparatus that is disposed in said gas container, and that includes a driver device, and a capturing device to be driven by said driver device into continuous movement; and a device control apparatus that includes a timer and a controller;

wherein said driver device includes a first roller and a second roller, and said capturing device includes a tape that is connected to said first roller and said second roller and that is configured to continuously move from said first roller to said second roller when said first roller and said second roller are rotating;

wherein said tape has a surface coated with an adhesive to purify the waste gas by capturing particulate matter in the waste gas;

wherein said controller is communicatively connected to said timer, said gas input unit, and said gas output unit, and is configured to control said gas input unit to be open after controlling said gas output unit to be closed, so as to perform a gas entering process in which the waste gas enters said gas container through said gas input unit, and said controller is further configured to control said gas input unit to be closed and control said timer to start timing for a predetermined purification period after completion of the gas entering process; and wherein said controller is configured to, when the timing for the predetermined purification period is completed, control said gas output unit to be open for allowing discharge of the waste gas that has been purified by said contaminant capturing apparatus out of said gas container.

15. The waste gas purification system of claim 14, wherein said capturing device further includes a release paper that is detachably attached to said tape.

* * * * *